April 10, 1928.

J. SHAW 1,665,610

MOTOR VEHICLE CHASSIS

Filed March 1, 1926

INVENTOR

James Shaw

BY

ATTORNEY

Patented Apr. 10, 1928.

1,665,610

UNITED STATES PATENT OFFICE.

JAMES SHAW, OF SAN FRANCISCO, CALIFORNIA.

MOTOR-VEHICLE CHASSIS.

Application filed March 1, 1926. Serial No. 91,365.

This invention relates to improvements in motor vehicle chassis construction, and particularly to the spring suspension means between the wheels and frame of the vehicle.

The principal object of my invention is to provide a chassis so constructed that the wheels are free to lift with inequalities in the road surface without lifting the frame and the body of the vehicle. This provides very easy riding of the vehicle, and eliminates practically all shocks and vibrations, thereby lengthening the life of all parts of the vehicle. The inherent features of construction of my chassis also allow of lesser expenditure of power in running the vehicle, with a consequent reduction of gasoline or other fuel consumption. The construction also provides a very low center of gravity for the body, which as is well known is a feature making for greater safety in operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
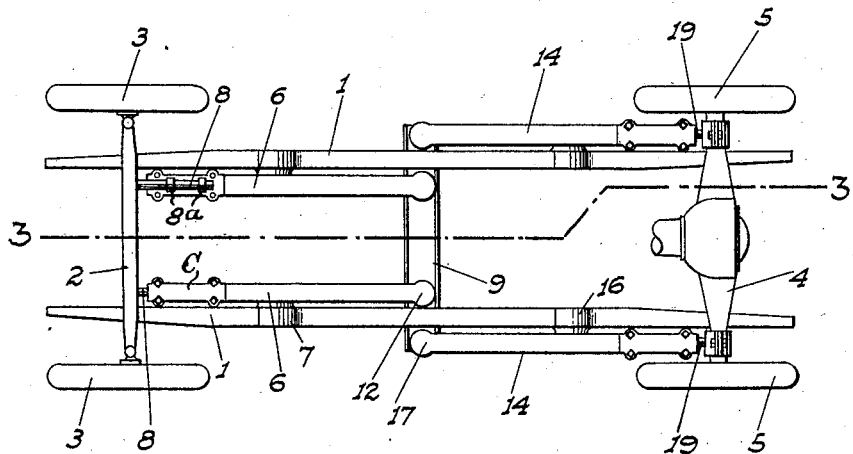
Fig. 1 is a top plan view of my improved chassis.
Figure 2:
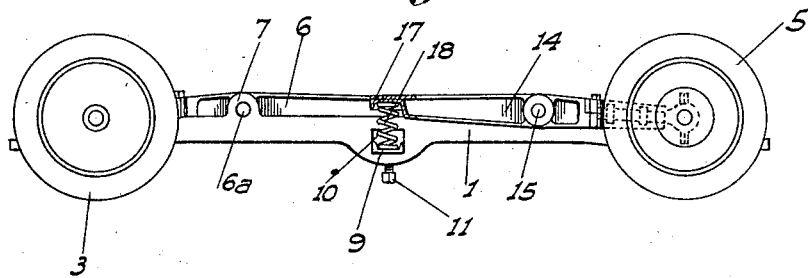
Fig. 2 is a side elevation of the same.
Figure 3:
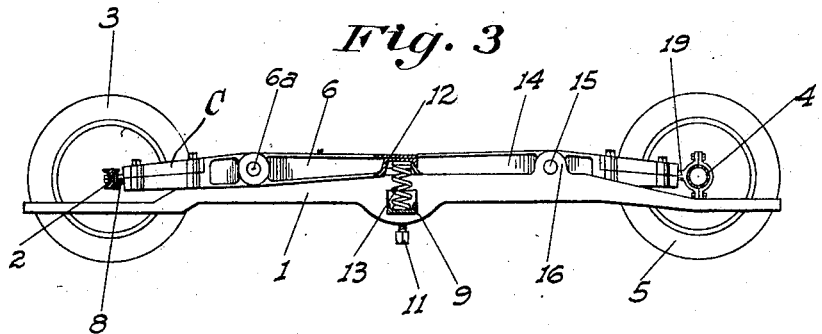
Fig. 3 is a longitudinal section on the line 3—3 of Fig. 1.

Referring now more particularly to the characters of reference on the drawings, the numeral 1 denotes the main side frames of the car, which as is customary are connected together by suitable cross members (not shown) so as to form a rigid unit. Adjacent the ends of the frame are the front axle 2, supporting the front wheels 3; and the rear axle housing 4 supporting the rear wheels 5.

Extending rearwardly from the front axle 2 preferably rearwardly of the frames 1 and parallel thereto are independent horizontal equalizing arms 6. These arms are pivoted intermediate their ends onto the frames, the latter being provided with suitable bosses 7 to receive the pivotal pins 6ª of the arms.

These arms are connected to the axle 2 by pins 8 secured to said axle and projecting into the adjacent ends of the arms 6, being turnable but longitudinally immovable therein. The pins have rigid collars 8ª thereon which fit in corresponding sockets in the arm-bores, so as to prevent longitudinal movement of the pins. To enable the pins and collars to be inserted in place in the arms, the ends of the latter are split horizontally for the length of the pin-bores, the upper portion being in the form of removable caps C. This structure rigidly secures the axle to the arms, and yet allows of the necessary transverse tilting of the axle relative to said arms.

A beam 9 preferably of an upwardly facing channel form extends transversely of the frames 1 under the rear ends of the arms 6 in spaced relation thereto. This beam is vertically adjustable in slots 10 provided in the frames 1, and is held at any vertical position by adjustment screws 11 mounted in the frames and bearing against the under face of the beam. The rear ends of the arms 6 are provided with downwardly facing cups 12 to receive the upper ends of coil springs 13 of rugged construction, the lower ends of which seat in the beam 9.

Extending rearwardly from and disposed above the arms 6 are equalizing arms 14, extending adjacent to and being vertically alined with the rear axle housing 4. These arms are preferably disposed outwardly of the frames 1 and extend parallel thereto. These arms are provided with pivotal pins 15 intermediate their ends which are turnably mounted in bosses 16 provided on the frames 1. The forward ends of the arms 14 are provided with downwardly facing cups 17 to receive the upper ends of springs 18, whose lower ends seat in the beam 9. The rear ends of the arms 14 are secured to the housing 4 by pins 19 which are secured to and project forwardly from said housing and into the arms 14 in the same manner as the pins 8 are secured in their arms 6.

In operation it will be seen that any wheel is free to lift relative to the frames 1 without imparting any lifting movement to said frames, the springs 13 or 18 being then individually compressed and taking the shock, the frames remaining stationary. The equalizing arms being all independent of each other, any wheel can lift independently of the others. Should the tension of the springs require adjusting at any time, this can be very easily and quickly done by manipulating the screws 11.

Though I have shown and specified coil springs as being used, springs of other form, air cushions or other resilient means to take the place of the metal springs may be used if found desirable.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A vehicle chassis comprising main longitudinal frame members, a front axle arranged for vertical movement relative to the frames, independent equalizing arms extending rearwardly from the front axle, said arms being pivoted onto the frames, spring means between said arms and frame for resisting upward movement of the axle relative to the frames, the front ends of the arms and the axle being in a common horizontal plane, and longitudinally extending pins secured to the axle and turnably mounted in the adjacent ends of the arms.

2. A motor vehicle chassis comprising main side frames, front and rear axles, arms supporting said front and rear axles and extending thence rearwardly and forwardly respectively, pivot connections between the arms and frames intermediate the ends of the arms, a transverse beam supported by the main frames, the free ends of all said arms overhanging the transverse beam, and vertical springs between said transverse beam and the free ends of the arms.

In testimony whereof I affix my signature.

JAMES SHAW.